(12) United States Patent
Seema et al.

(10) Patent No.: US 9,838,760 B2
(45) Date of Patent: Dec. 5, 2017

(54) SYSTEMS AND METHODS FOR NAME-BASED SEGMENTED MEDIA ACQUISITION AND DISTRIBUTION FRAMEWORK ON A NETWORK

(71) Applicant: ARIZONA BOARD OF REGENTS ON BEHALF OF ARIZONA STATE UNIVERSITY, Tempe, AZ (US)

(72) Inventors: Adolph Seema, Tempe, AZ (US); Martin Reisslein, Tempe, AZ (US)

(73) Assignee: Arizona Board of Regents on behalf of Arizona State University, Tempe, AZ (US)

( * ) Notice: Subject to any disclaimer, the term of this patent is extended or adjusted under 35 U.S.C. 154(b) by 0 days.

(21) Appl. No.: 14/961,706

(22) Filed: Dec. 7, 2015

(65) Prior Publication Data

US 2016/0173959 A1   Jun. 16, 2016

Related U.S. Application Data

(60) Provisional application No. 62/092,527, filed on Dec. 16, 2014.

(51) Int. Cl.
| | |
|---|---|
| H04N 21/235 | (2011.01) |
| H04N 21/845 | (2011.01) |
| G11B 27/10 | (2006.01) |
| H04N 21/6587 | (2011.01) |
| H04N 21/643 | (2011.01) |

(Continued)

(52) U.S. Cl.
CPC ......... *H04N 21/8456* (2013.01); *G11B 27/10* (2013.01); *H04N 21/26258* (2013.01); *H04N 21/64322* (2013.01); *H04N 21/6581* (2013.01); *H04N 21/6587* (2013.01)

(58) Field of Classification Search
CPC combination set(s) only.
See application file for complete search history.

(56) References Cited

U.S. PATENT DOCUMENTS

| | | | |
|---|---|---|---|
| 2010/0180289 A1* | 7/2010 | Barsook | G06Q 30/02 725/29 |
| 2014/0219346 A1* | 8/2014 | Ugur | H04N 19/00575 375/240.12 |
| 2014/0344410 A1 | 11/2014 | Saremi et al. | |

OTHER PUBLICATIONS

A. Seema et al., "WVSNP-DASH: Name-Based Segmented Video Streaming", IEEE Transactions on Broadcasting, vol. 61, No. 3, pp. 346-355 (2015).

(Continued)

*Primary Examiner* — Kieu Oanh T Bui
(74) *Attorney, Agent, or Firm* — Ari M. Bai; Polsinelli PC

(57) ABSTRACT

A media network platform is disclosed. The media network platform utilizes a computing device comprising at least one memory for storing instructions that are executed by at least one processor. Media data is retrieved from at least one data source. A plurality of media segments are created from the media data with each of the media segments being independently playable. A plurality of unique identifiers is assigned to each of the respective media segments. A request is received to transmit a media segment of the plurality of media segments for playback with the request including information about a unique identifier assigned to the media segment. The media segment is transmitted using the unique identifier. The media segment comprises a portion of a video derived from the media data and comprises any specific time interval of the video.

22 Claims, 5 Drawing Sheets

(51) Int. Cl.
 H04N 21/262 (2011.01)
 H04N 21/658 (2011.01)

(56) References Cited

OTHER PUBLICATIONS

A. Seema et al., "Towards Efficient Wireless Video Sensor Networks: A Survey of Existing Node Architectures and for a Flexi-WVSNP Design", IEEE Communications Surveys & Tutorials, vol. 13, No. 3, pp. 462-486 (2011).
T. Shah, "A Cross-Layer Power Analysis and Profiling of Wireless Video Sensor Node Platform Applications", Master of Science Thesis, Arizona State University, Aug. 2014.
L.A. Schwoebel, "Browser- and Codec-Agnostic HTML5 Video-Streaming in the Wireless Video Sensor Network Master Platform", Thesis, Otto-Friedrich University & Arizona State University, Jul. 2014.
C. Xu et al., "Streaming Hierarchical Video Segmentation", Computer Vision—ECCV 2012, pp. 626-639 (2012).
C. Concolato et al., "Usages of DASH for rich media services," in Proc. ACM Conf. Multimedia Syst., Santa Clara, CA, USA, pp. 265-270 (2011).
T. Lohmar, et al., "Dynamic adaptive HTTP streaming of live content," in Proc. IEEE Int. Symp. World Wireless Mobile Multimedia Netw. (WoWMoM), Lucca, Italy, pp. 1-8 (2011).
I. Sodagar, "The MPEG-DASH standard for multimedia streaming over the Internet," IEEE Multimedia, vol. 18, No. 4, pp. 62-67 (2011).
N. Staelens et al., "Subjective quality assessment of longer duration video sequences delivered over HTTP adaptive streaming to tablet devices," IEEE Trans. Broadcast., vol. 60, No. 4, pp. 707-714 (2014).
A. Molnar et al., "Cost-oriented adaptive multimedia delivery," IEEE Trans. Broadcast., vol. 59, No. 3, pp. 484-499 (2013).
R. Trestian et al., "Energy-quality-cost trade-off in a multimedia-based heterogeneous wireless network environment," IEEE Trans. Broadcast., vol. 59, No. 2, pp. 340-357 (2013).
J. Maisonneuve et al., "An overview of IPTV standards development," IEEE Trans. Broadcast., vol. 55, No. 2, pp. 315-328 (2009).
J.-C. Dufourd, et al., "Recording and delivery of HbbTV applications," in Proc. 9th Int. Interact. Conf. Interact. Televis., Lisbon, Portugal, pp. 51-54 (2011).
R. Malhotra, "Hybrid broadcast broadband TV: The way forward for connected TVs," IEEE Consum. Electron. Mag., vol. 2, No. 3, pp. 10-16 (2013).
S. Kaiser et al., "MPEG-DASH enabling adaptive streaming with personalized commercial breaks and second screen scenarios," in Proc. 11th Eur. Conf. Interact. TV Video, Como, Italy, pp. 63-66 (2013).
B. Ciubotaru, et al., "Subjective assessment of region of interest-aware adaptive multimedia streaming quality," IEEE Trans. Broadcast., vol. 60, No. 1, pp. 50-60 (2014).
L. Shi, et al., "CellTV—On the benefit of TV distribution over cellular networks: A case study," IEEE Trans. Broadcast., vol. 60, No. 1, pp. 73-84 (2014).
C. Xu et al.,, "Performance evaluation of multimedia content distribution over multi-homed wire-less networks," IEEE Trans. Broadcast., vol. 57, No. 2, pp. 204-215 (2011).
C. Xu et al., "Ant-inspired mini-community-based solution for video-on-demand services in wireless mobile networks," IEEE Trans. Broadcast., vol. 60, No. 2, pp. 322-335 (2014).
M. Zorrilla, et al., "End to end solution for interactive on demand 3D media on home net-work devices," in Proc. IEEE Int. Symp. Broadband Multimedia Syst. Broadcast. (BMSB), Seoul, Korea, pp. 1-6 (2012).

\* cited by examiner

SYSTEMS AND METHODS FOR NAME-BASED SEGMENTED MEDIA ACQUISITION AND DISTRIBUTION FRAMEWORK ON A NETWORK

CROSS-REFERENCE TO RELATED APPLICATIONS

This is a non-provisional application that claims benefit to U.S. Provisional Application Ser. No. 62/092,527 filed on Dec. 16, 2014, which is herein incorporated by reference in its entirety.

TECHNICAL FIELD

The present document generally relates to digital media content; and more particularly, to systems and methods for generating, storing, and distributing media over a network using independently playable media segments and a specialized naming syntax.

BACKGROUND

Wireless sensor nodes, such as video sensors are attractive for a wide range of web-based consumer electronics applications, e.g., remote surveillance. However, conventional methods of managing and transmitting digital media obtained from such sensor nodes have various drawbacks. For example, existing web-based video streaming frameworks, such as the HyperText Transfer Protocol (HTTP), Live Streaming (HLS), and the Motion Picture Experts Group's Dynamic Adaptive Streaming over HTTP (MPEG-DASH), have dependencies between the individual video segments and a manifest file that contains video metadata. These manifest files require special segment generation tools and create dependencies between the segments of a given video stream, complicating video data management and distribution and leading to compatibility issues.

Further, existing web-based video players are limited to fetching video segments over TCP/IP networks. The video segment dependencies complicate video segment distribution by resource-constrained sensor nodes, which typically employ non-TCP/IP protocols. Moreover, existing players require complex plug-ins that invite security vulnerabilities or have very limited cross-platform support. It is with these observations in mind, among others, that various aspects of the present disclosure were conceived and developed.

SUMMARY

A need exists for improved media network frameworks and/or platforms for media acquisition and transmission. Accordingly, one implementation of the present disclosure may take the form of a method of acquiring and distributing media data comprising the steps of utilizing a computing device comprising at least one memory for storing instructions that are executed by at least one processor to perform the operations of: retrieving media data from at least one data source; creating a plurality of media segments from the media data with each of the media segments being independently playable; assigning a plurality of unique identifiers to each of the respective plurality of media segments; receiving a request to transmit a media segment of the plurality of media segments for playback with the request including information about a unique identifier of the plurality of unique identifiers assigned to the media segment; and transmitting the media segment using the unique identifier.

Another implementation of the present disclosure may take the form of acquiring and distributing media data comprising: acquiring digital media in the form of a plurality of media segments, wherein each of the plurality of media segments covers a specified time interval; applying a media segment naming syntax to the plurality of media segments; and retrieving one or more of the plurality of media segments based upon the media segment naming syntax.

Yet another implementation of the present disclosure may take the form of a system for acquiring and distributing media data comprising: a media player configured for retrieving media data in the form of one or more media segments from a source; and a database comprising the one or more media segments, each of the one or more media segments being associated with a unique identifier using a media segment naming syntax.

BRIEF DESCRIPTION OF THE DRAWINGS

Corresponding reference characters indicate corresponding elements among the view of the drawings. The headings used in the figures do not limit the scope of the claims.

DETAILED DESCRIPTION

Figure 1:
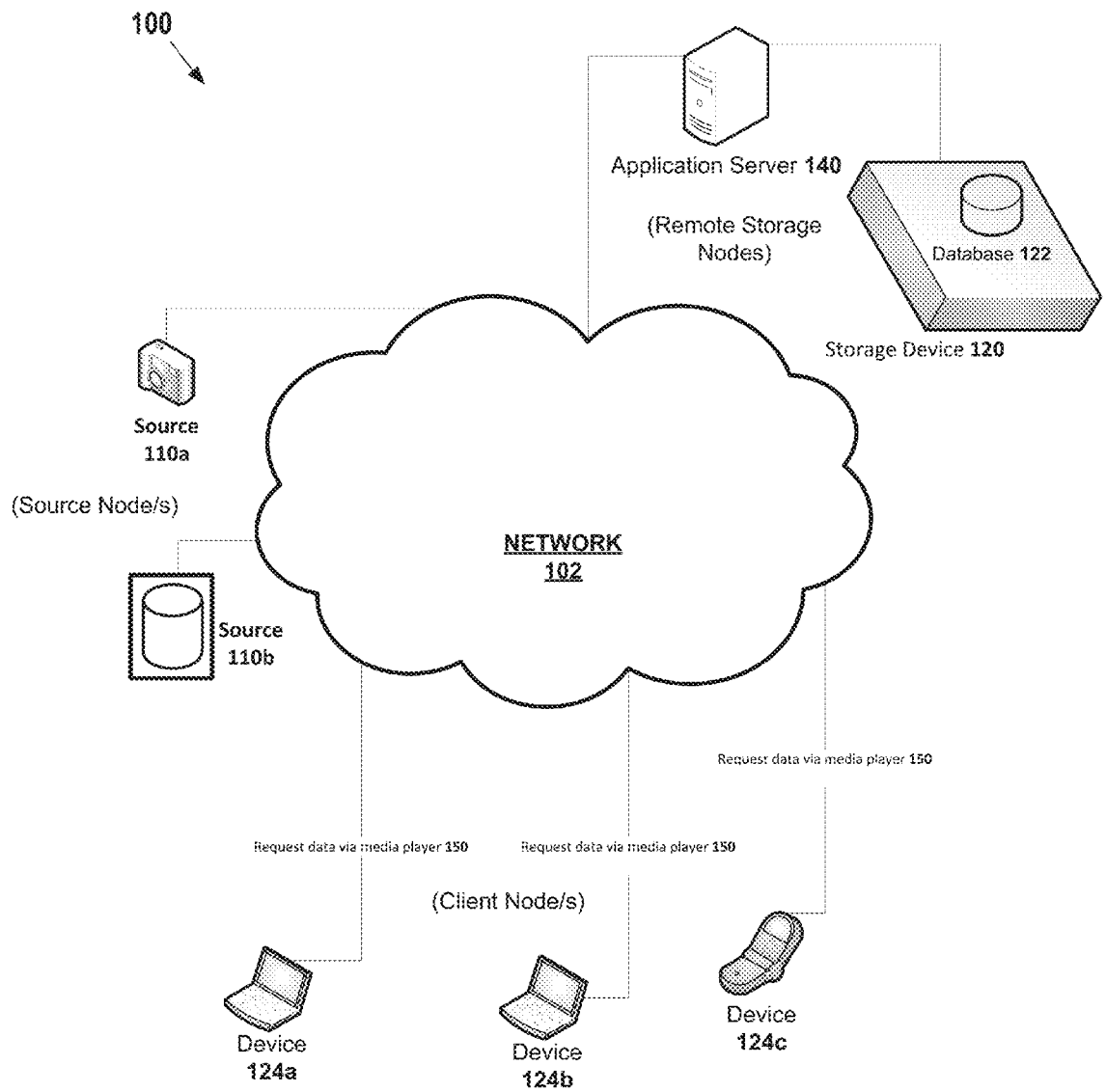
FIG. 1 is a systems diagram of a media acquisition and distribution framework or network platform, according to aspects of the present disclosure.

Aspects of the present disclosure comprise a media acquisition and distribution framework including a media player. Media data is retrieved from at least one data source. A plurality of media segments are created from the media data with each of the media segments being independently playable. A plurality of unique identifiers is assigned to each of the respective media segments. A request is received to transmit a media segment of the plurality of media segments for playback with the request including information about a unique identifier assigned to the media segment. The media segment is transmitted using the unique identifier. In one embodiment, the media segment comprises a portion of a video derived from the media data and comprises any specific time interval of the video. More particularly, in one embodiment, the disclosed framework may comprise a Wireless Video Sensor Network Platform compatible DASH (WVSNP-DASH) framework and a WVSNP-DASH Player (WDP) for flexible web-based access of video from sensor nodes on consumer electronics. The WVSNP-DASH framework may be based on independently playable video segments with a specific naming syntax that conveys important metadata so as to facilitate flexible search, transfer, and playback. In one embodiment, the WDP may employ processes of version 5 of the HyperText Markup Language (HTML5) for video buffering and playback. Video segments may be fetched into the HTML5 File System (FS) space, permitting flexible video fetching over a wide range of protocols, including sensor network protocols. Comparative evaluations of a WDP prototype with optimized HLS and MPEG-DASH players indicate that WDP has low client (receiver) load, while providing significant potential for power savings on the sensor node serving the video streams.

According to aspects of the present disclosure, data sources, such as wireless sensor nodes, can collect data that can support a wide range of services on consumer electronic devices. For instance, wireless sensor nodes can support surveillance and security applications. A number of platforms and gateways can make sensor data readily accessible over the Internet to enable interactions between networked sensors and consumer devices. Data sources may further include data file sources hosted on one or more devices accessible by such consumer devices.

Video is a particularly important type of sensor data as consumer electronics with video displays, such as smart phones, are becoming ubiquitous. Video data from a wide range of video sensors has the potential to enhance a variety of entertainment, residential, and industrial use cases of wireless sensor networks. Additionally, sensor data may include general multidimensional (2D and 3D) data, e.g., from infrared sensors, heat maps, Light Emitting Diode (LED) pixel sensor maps, and x-rays using wirelessly linked sensor nodes and remote acquisition devices. A wide range of consumer devices with web browsers may benefit from smooth continuous playback of such sensed video and general multidimensional data without specialized software or protocols for the different data types. Consumers desire to flexibly request data and view time periods of interest in the video or data on their devices.

The cross-platform video use on consumer devices may be addressed by version five of the Hypertext Markup Language (HTML5) and the emerging Dynamic Adaptive Streaming over HTTP (DASH) specification. However, HTML5 does not support adaptive real-time video playback. Also, existing frameworks can only interact with video server nodes operating the Transmission Control Protocol (TCP)/Internet Protocol (IP) networking protocol stack. That is, none of the frameworks are designed to interact with the popular non-TCP/IP protocol stacks on resource-constrained sensor (server) nodes, such as Zigbee. Moreover, existing frameworks require complex plug-ins that invite security vulnerabilities or have very limited cross-platform support.

An important structural limitation of existing web-based video streaming frameworks, such as the Hypertext Transfer Protocol Live Streaming (HLS) and the Motion Picture Experts Group Dynamic Adaptive Streaming over HTTP (MPEG-DASH), is that individual video segments cannot be independently distributed and played. Instead, a video segment can only be interpreted and played with reference to a manifest file (and typically a special initialization video segment). These dependencies complicate the video data management on resource-constrained video sensor nodes as well as the distribution of video segment files through sensor networks, e.g., video segment files cannot be independently cached and distributed by storage-constrained sensor nodes.

Playback of video is supported by most modern web browsers as a feature of HTML5. Generally, HTML5 based video players may utilize the HTML5 video tag to download and play full-length video files. However, the HTML5 <video> tag is not uniformly nor completely implemented by common web browsers, requiring players to implement workarounds if the video tag fails to open, play, or render the <video> source. Also, with HTML5, adaptation of the video bit rate or presentation quality would require the re-download of the entire video file. While Media Source Extensions (MSEs) could serve as a basis for adaptive streaming in HTML5 based video players, MSE support is inconsistent in popular web browsers, limiting the cross-browser compatibility of an MSE-based player design.

Alternatively, web browser video plug-ins could adapt video streaming through slicing the full-length video file and monitoring the download of the different presentation qualities (versions). However, such plug-ins can give rise to a multitude of security and incompatibility issues as well as burden the user with updating and maintaining the plug-ins.

According to the Dynamic Adaptive Streaming over HTTP (DASH) specification, a web-based DASH video player must be able to adapt the video presentation quality level during playback by switching among different quality versions of the video stream. A plug-in free player must support the playback of chunks (segments) derived from a video stream via an HTML5 video element. DASH players support interactions, such as jump backward (rewind, RW) or forward (fast forward, FF) by fetching the video segment for the desired playback point. However, existing DASH players must first process the manifest file and play the initialization segment before such playback jumps. A media player according to aspects of the present disclosure, such as the WVSNP-DASH Player (WDP), does not require an initialization segment and thus provides truly random segment playback on demand.

Importantly, none of the existing video players is designed to integrate with non-TCP/IP networks, such as resource-constrained WSN employing the Zigbee protocol. Overall, these recent DASH player developments do not comply with the cross-platform design goal of HTML5, instead they are limited to specific web browsers with their respective plug-ins. In contrast to existing DASH players, the WVSNP-DASH framework is configured to make video data from sensor networks as widely accessible as possible with little effort, if any, from the consumer device user.

There has been a recent focus on the lower layers of the Internet protocol stack for integrating sensor networks into the overall Internet of Things (IoT). A widely considered approach is IP version 6 based Low power Wireless Personal Area Networks (6LoWPAN), which covers radios and firmware that compress IPv6 packet headers into smaller 6LoW-PAN headers suitable for low-data-rate IEEE 802.15.4 personal area network standards, such as Zigbee, operating in sensor networks. The proposed WVSNP-DASH framework and WDP are designed to directly work within these low-data-rate mesh networks.

Sensor focused services may be viewed as components in service based frameworks to serve as a cloud-based repository directory of sensor data using service oriented architectures (SOA), infrastructures, and protocols. However, video sensors are typically not designed to take advantage of SOA data exchange structures. In particular, sensor data cloud repositories presently have no concept of video as search-able or addressable sensor data. The name syntax of the proposed WVSNP-DASH framework enables cloud repositories to offer video segments as part of data sets and services.

The name-based structure of the WVSNP-DASH framework of the present disclosure is compatible with information centric networking. At the same time, the proposed WVSNP-DASH framework is designed to work beyond TCP/IP networks so that it makes media data, such as video data on sensor nodes employing other (non-TCP/IP) network protocols readily available to consumer electronics.

FIG. 1 illustrates a systems diagram for an exemplary media acquisition and distribution framework 100 or network platform according to aspects of the present disclosure. The framework is based on independently playable video segments with a specific naming syntax that conveys important metadata so as to facilitate flexible search, transfer, and playback functionalities. A network 102 is shown enabling communication between data sources 110, an application server 140, a storage device 120, a database 122 hosted by the storage device 120, and one or more devices 124. Network 102 may include any system capable of passing content and communications between the devices 124 and data sources 110 such as, the Internet, a virtual private network, a local area network, a wide area network, a Wi-Fi network, a cellular network, or any combination thereof. For example, network 102 of framework 100 may enable media segment delivery from TCP/IP networks as well as non-TCP/IP networks such as Zigbee or Bluetooth networks. FIG. 1 further shows each of the devices 124 accessing a media player 150 of framework 100 utilizing at least one processor of the devices 124.

As shown in FIG. 1, data sources 110 may comprise wireless sensors 110a that can collect data in various forms that can support a wide range of services on consumer electronic devices 124. For instance, wireless sensors 110a can support surveillance and security applications. Sensors 110a may be configured to collect data in the form of multidimensional (2D and 3D) data, e.g., from infrared sensors, heat maps, Light Emitting Diode (LED) pixel sensor maps, and x-rays using one or more wirelessly linked sensor nodes. Sensors 110a may further comprise webcams or general camera devices or any other device capable of detecting changes in an environment and capturing data associated with the same.

Data sources 110 may further include data file sources 110b which may comprise data repositories hosted on one or more devices (e.g., computing devices) accessible by such consumer devices. In other words, data file sources 110b may include pre-collected data that is available to consumer devices 124 in addition to or to complement data collected from sensors 110a. The framework 100 is not limited to the number of sources 110 shown and may comprise any number of sensors 110a and/or data file sources 110b. Collectively, as shown in FIG. 1, the sensors 110a and data file sources 110b may comprise source nodes. In one alternate embodiment, data sources 110 may further comprise an information centric network such as a content distribution network (CDN) such that video/media data may be received within framework 100 from a CDN.

Application server 140 may comprise at least one processor configured with instructions and logic to implement certain aspects of the media framework of the present disclosure. Application server 140 may further be configured to create and manage a network of data sources 110. For example, application server 140 may be configured to push updates to the data sources 110 as needed for, e.g., modifying the naming syntax described herein. A storage device 120 and database 122 may be coupled to application server 140. Collectively, the application server 140 and storage device 120 may comprise a remote storage node of the framework 100. Media data captured by sensor nodes 110a or provided by data file sources 110b may be transmitted to database 122 and storage device 120 such that the media data is accessible by, e.g. consumer devices 124. Alternatively, in other embodiments, media files may be retrieved directly from data sources 110. As a flexible network 100 with independently playable media files/segments, individual media segments, which may be combinable with other media segments as part of a video or larger media file, may be accessed and played independently from a variety of different locations and devices. In other words, video segments of a video may be distributed or spread across different nodes of the network 102 and accessed as needed.

Consumer devices 124 request and receive information captured from sources 110 using a media player 150 executed by a processor of the devices 124. In one embodiment, the media player 150 may comprise the WDP player disclosed herein. Each of the devices 124a, 124b, and 124c may include some form of consumer device such as personal computer, a thin client, a tablet, a smart phone, mobile device, a set-top box, a cable box, or the like, that is capable of running a browser and providing a user with the ability to request content over a network connection, or some other application suitable for interacting with a network and requesting content therefrom.

The framework 100 depicted in FIG. 1 may comprise the Wireless Video Sensor Node Platform (WVSNP, may be pronounced "WaveSnap") compatible DASH framework, abbreviated as WVSNP-DASH. Existing web-based media streaming frameworks rely on special manifest files and initialization segments to convey the media meta-information. These manifest files require special segment generation tools and create dependencies between the segments of a given media stream, complicating media data management and distribution and leading to compatibility issues. In contrast, each media segment in the proposed WVSNP-DASH framework is an independently playable file carrying its essential metadata in its name.

The WVSNP-DASH framework includes a specific name syntax for media segments, e.g., video segments. The name syntax conveys essential meta-information about the video segment; thus eliminating dependencies to manifest (and initialization) files. The proposed WVSNP-DASH framework is highly backward compatible and interfaces with wireless sensor networks (WSNs) without special re-design of video file formats, video containers, sensor nodes, or networks. WVSNP-DASH is video container agnostic and encapsulates any container, codec, or Digital Rights Management (DRM), as long as the web browser supports it.

The media player 150 of FIG. 1 may comprise a WVSNP-DASH Player (WDP) which, in some embodiments, may be based on core elements of HTML5 (although the framework 100 and media player 150 are not limited to HTML 5). The WDP provides a user interface to the WVSNP-DASH framework by allowing consumers to retrieve and play media from sensor nodes via devices 124. The WDP does not rely on any plug-ins or backend engines. Instead, in one embodiment using video data and HTML5, the WDP may employ downloading through HTTP as well as the HTML5 File System (FS) together with the HTML5 video tag for managing video segment retrieval, transmission, and playback. The video segment fetching into the HTML5 FS enables video segment delivery from non-TCP/IP networks, such as Zigbee networks and the video segments may be displayed on the HTML5 canvas element.

More particularly, the framework 100 may facilitate media and/or multimedia acquisition, storage, distribution, and playback through assigning a unique name to a given independently playable multimedia object. If a node has a WiFi, Zigbee, or Bluetooth radio, a media object source can be uniquely named for the media player 150 to be able to fetch the object. This design of independently playable media objects with a specific naming syntax enables media data object distribution across networks, including cross-network data transfers between traditional IP network and sensor networks.

In one embodiment, all media segments have the same type and format; in particular, each segment may comprise a complete media file (e.g. complete video file or video). In the case of video data, the source (server) node may only process the video file data when creating the media file. A created video file is then always ready to be fetched and transmitted without any further preprocessing on the source (server) node. This approach reduces source (server) node power consumption compared to existing HLS and MPEG-DASH frameworks.

The framework 100 can reduce or avoid requiring a browser to support DASH directly via the video element. Further, the media player 150 simplifies capturing video as it does not require the server to specially format multimedia data, as MPEG-DASH and HLS do. In some embodiments, the framework 100 employs processes of version 5 of the HyperText Markup Language (HTML5) for video buffering and playback. Video segments may be fetched into an HTML5 File System (FS) space, thereby permitting flexible video fetching over a wide range of protocols, including sensor network protocols.

The framework 100 may comprise a WVSNP-DASH media segment naming syntax that uniquely names or provides a unique identifier for each media segment. The syntax of the segment name may comprise complete information for a media player 150 such as a WVSNP-DASH player (WDP) to be able to play back media files stored in a remote network node or residing on one or more data sources 110. For example, a client, using one or more devices 124, may playback an entire video-on-demand (VOD) set or live video based solely on the metadata-information gleaned from parsing the segment name.

The WVSNP-DASH segment naming syntax may follow a simplified Backus-Naur Form:

<filename>-<maxpresentation>-<presentation>-<mode>-<maxindex>-<index>.<ext>

The components of the name syntax may be defined as follows:
  <filename>: This is a unique string for each video stream (set of video segments). The <filename> represents the path, e.g., through an IP address or a URL, to the video stream or a unique pre-fix describing the stream.
  <maxpresentation>: This integer defines the index of the highest presentation quality (e.g., quality version) available for the stream.
  <presentation>: The actual presentation quality of this video-segment file. A lower index defines a lower quality of the stream, whereby 0 is defined as the index denoting the lowest available video quality.
  <mode>: This string indicates the playback mode, e.g., video on demand (VOD) or live playback (LIVE).
  <maxindex>: This integer gives the total number of segments available for playback.
  <index>: This integer gives the index of this segment within the finite set of segments of this stream.
  <ext>: This string indicates the video container format of this segment, e.g., .mp4 or .webm. The player decides if the container format and encoded video can be played back and informs the user accordingly.

This simple WVSNP-DASH video segment name syntax contains the complete information needed by a WVSNP-DASH client to retrieve and play media segments in a network such as network 102. The simplicity of this name syntax has far-reaching implications as it transfers most of the playback and retrieval complexity to the player, i.e., media player 150. The media player 150 is the consumer of the data, and thus knows what it wants to do with the data and how to interpret the media data. In some embodiments, the meta-data in the name syntax that uniquely and completely defines a given media segment may be conveyed through alternate means, e.g., through meta information in the internal head of the media file, instead of the actual file name.

The framework 100 utilizes the uniqueness of the media segment's name. Since wireless sensor networks are resource constrained in terms of power, computing resources, and storage space, the framework 100 may be configured such that media files within a sensor network are captured and stored as complete, individually playable video files of short duration, preferably no longer than ten seconds.

Unlike HLS and MPEG-DASH which requires the manifest file in conjunction with the individual media segment files for playback, the WVSNP-DASH segment name syntax of framework 100 ensures that the name of the media segment, or any other future network media object, conveys sufficient information for a media player 150 to decide how to fetch and play the media segments. The manifest files required by HLS and MPEG-DASH introduce incompatibility problems as they require browsers to support manifest files as well as live playback maintenance of the manifest files. By communicating all player pertinent metadata through the segment file name, WVSNP-DASH framework 100 avoids these incompatibility problems and is thus highly backward compatible.

Another important feature of the framework 100 is random playback of any media segment, as needed by the media player 150. In particular, framework 100 has no special initialization segment, which is necessary for HLS and MPEG-DASH players to understand how to play a media file such as a video. Each WVSNP-DASH media segment has enough metadata (in its name) to start playing the media file or video. This feature enables unlimited "crawler type" network search algorithms. These can be used by future information centric network (ICN) routers and content distribution networks (CDNs). Future active players may start playing a video associated with a video segment as soon as the segment is discovered.

In one specific example, a segment name may comprise: src=filename-1-1-VOD-45-7.mp4 and can be easily passed to a media player 150. Based on the meta-information contained in this name, the media player 150 can initiate the streaming process of segments 7 to 45 by fetching all segments and playing them one after another. The random playback feature of WVSNP-DASH enables the media player 150 to perform arbitrary fast forward (FF) and rewind (RW) of the video. The naming syntax of WVSNP-DASH also enables the player to take advantage of all DASH features, such as adaptive switching.

Exemplary WVSNP-DASH Player (WDP)

The media player 150 may utilize core elements of HTML5 to render video/media, or, may alternatively use or in combination may use components of Flash, VLC, QuickTime or future video rendering canvases. As described above, the media player 150 may comprise a specific WVSNP-DASH player (WDP). In one specific embodiment, the WDP design may be based upon widely supported HTML5 features, so as to achieve broad cross-platform support. Selecting HTML5 features that are reliably supported by most browsers is generally difficult. Therefore, in the instant embodiment, the WDP may be constrained to using only official core HTML5 features.

The WDP may combine the advantages of common support for HTTP downloading via Asynchronous JavaScript and XML (AJAX) (through the XMLHttpRequest functionality) as well as the HTML5 File System (FS) Application Programmers Interface (API). The HTML5 FS is run-time memory allocated to a process running on a browser. Data objects in this protected (sandbox) space can be cached for future use by the same URL on the same browser. Other URLs in separate tabs or other browser windows cannot access this memory space. Both AJAX and the FS API may be used as they are broadly supported HTML5 features. Where the FS API is not yet fully supported, third-party wrappers such as IndexedDB may be used to mimic the FS API. This approach helps to keep the design logic intact across browsers as well as to maintain compatibility as official support improves.

Figure 2:
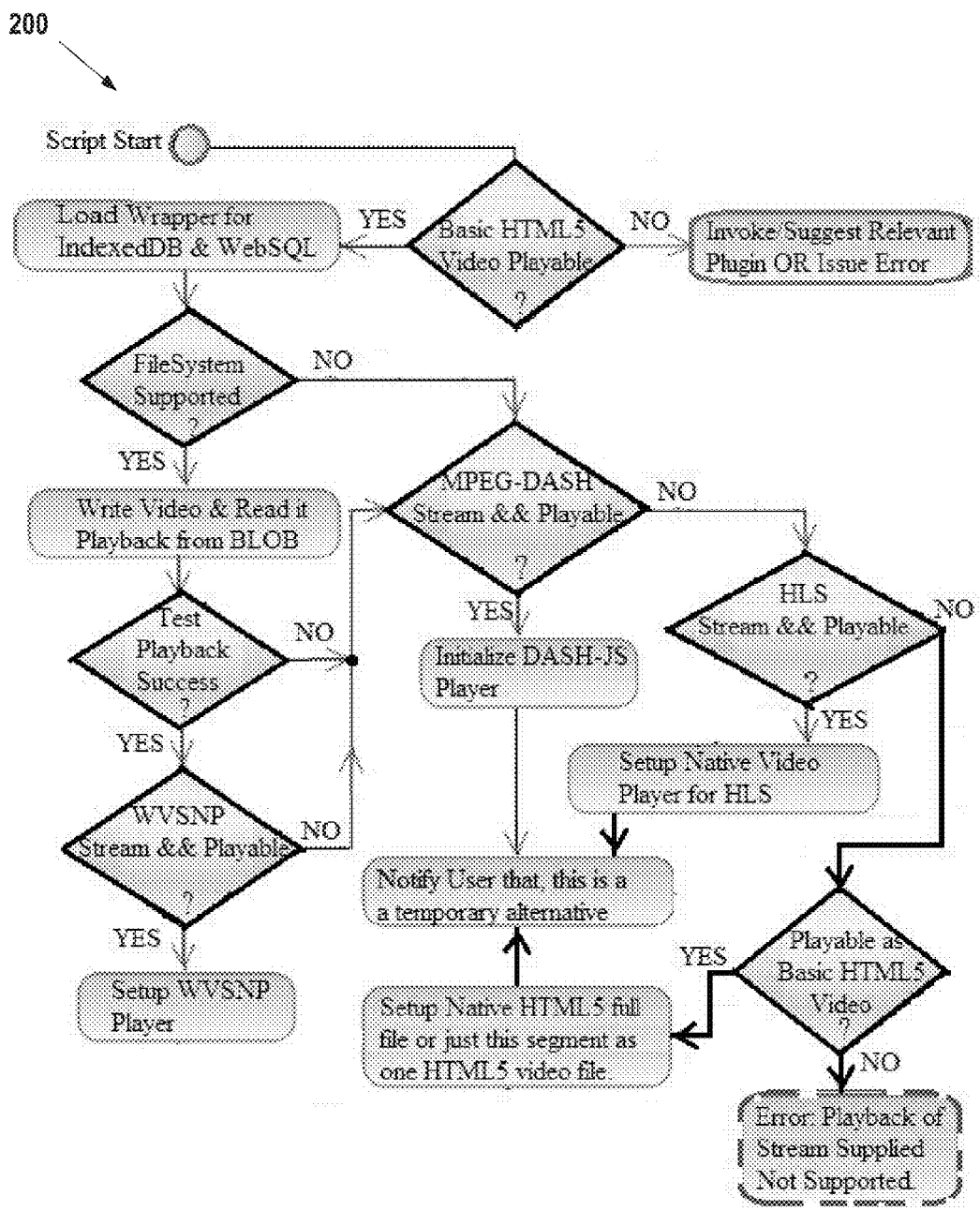
FIG. 2 is a compatibility test module for a media player as part of a specific embodiment utilizing core elements of HTML 5, according to aspects of the present disclosure.

An entry point of one embodiment of the WDP is the browser detection and compatibility test module illustrated in FIG. 2. This exemplary module tests if the browser supports the core HTML5 features used by one embodiment of the WDP. AJAX tools check support for downloading, saving, and playing back requested video via FS API or a suitable wrapper. If an MPEG-DASH manifest file is provided and the browser supports MSE, the DASH-JS player (a precursor of dash.js) may be launched as an independent module within the WDP modular architecture. Alternatively, for an HLS manifest file, the native video player of the web browser is set up with HLS. If the URL (name) of a requested video does not match the WVSNP-DASH video segment name syntax, and neither the HLS nor MPEG-DASH manifest syntax, WDP assumes a traditional HTML5 compatible video file. The HTML5 video file is then played back in the browser's native HTML5 video element as legacy full-length video. Otherwise, the default is to play WVSNP-DASH video.

The instant embodiment of the WDP is relatively future proof in that the WDP works on any browser with support for the HTML5 core elements. Also, any future new video codec, such as H.265/HEVC or VP9, or any future video container format, that can be played as a whole video via an HTML5<video> element, is supported by WDP.

The WDP may comprise two main processes running in parallel: a buffering process and a playback process. Each process may have its own writing (buffer) and reading (player) counters. In one embodiment, the buffering process 300 runs continuously in a loop to fetch segments from a remote server node 312 into an HTML5 FS 304 as shown in the top part in FIG. 3. Each of the loop iterations may handle one video segment (file) for the currently selected video stream and presentation quality. The file may be represented as a binary large object (Blob). A Blob is a data structure that encapsulates raw binary data and can be fed directly to an HTML5<video> element. For VOD, the buffering process may run continuously until the last segment has been downloaded. However, the user may restart the process with an arbitrary segment by changing the presentation quality or fast-forwarding to a point beyond the buffer line.

Figure 3:
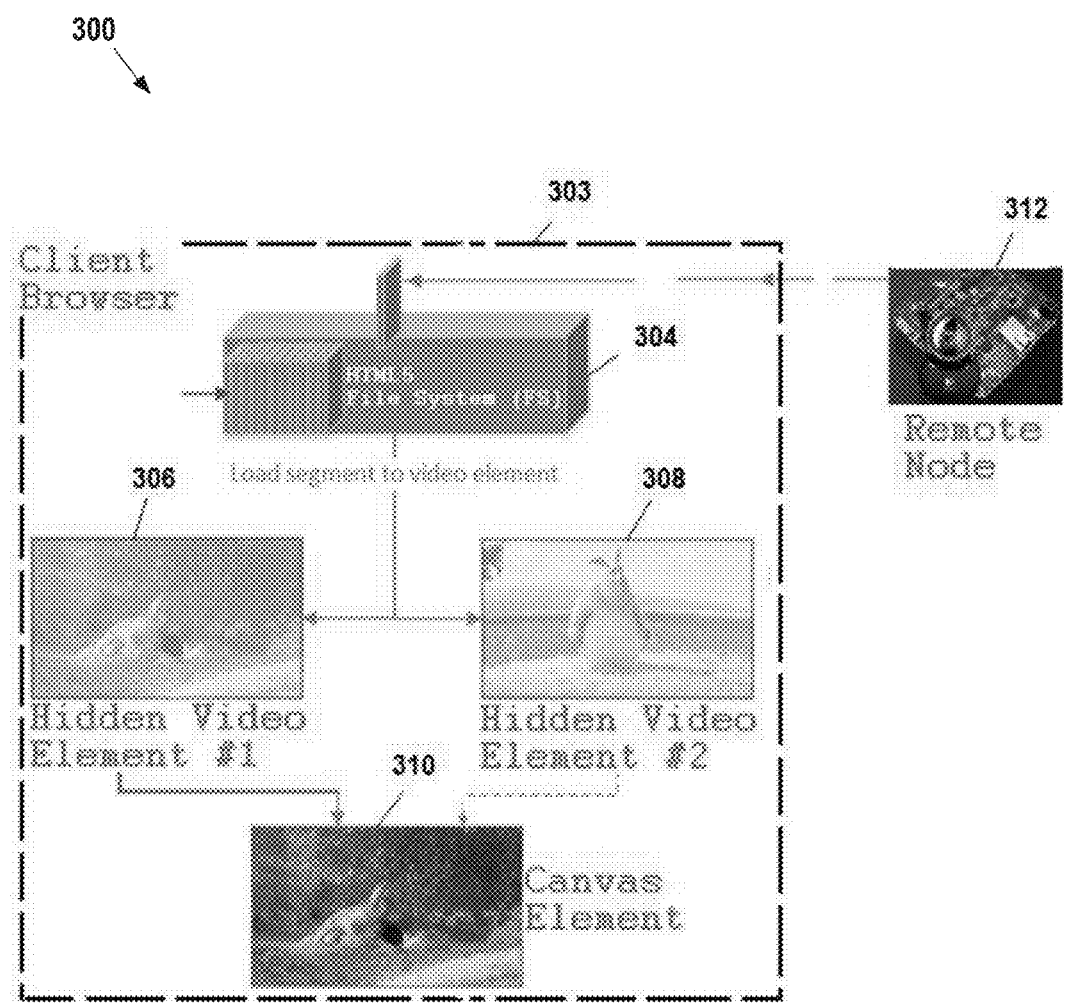
FIG. 3 is a simplified illustration showing an overview of a WVSNP-DASH playback, according to aspects of the present disclosure.

The playback process may be at least three segments behind the buffering process. As shown in FIG. 3, in order to stitch the segments seamlessly together, there may be two hidden <video> elements 306/308 which contain consecutive video segments. When one segment ends, the corresponding <video> element triggers an event, which in turn triggers the playback of the next video segment from the other <video> element. The now unused <video> element is linked to the subsequent segment by loading the segment from the HTML5 FS 304. Similar to the buffering process, the file is loaded as raw binary data in a Blob variable and fed directly to the <video> element.

Glitches in the form of resizing <video> elements or black screens during the transitions from one <video> element to the next may be reduced or avoided with an HTML5<canvas> element 310. Each frame of the currently active video element is drawn on the <canvas> element 310. During a transition, the last active frame is displayed. With the canvas element 310, the transition glitches caused by the slow JavaScript are not visible to the viewer. For streams with continuous audio, longer video segments reduce glitches in the audio track playback due to fewer transitions. Audio fading techniques can be employed to seamlessly morph the audio tracks of the video segments.

The use of the HTML5 FS in conjunction with the HTML5 canvas for rendering video in one embodiment of the WDP enables the rendering of video that arrives to the player via other network mechanisms, aside from basic HTTP/AJAX mechanisms. For instance, the WDP design allows the rendering of images and data that arrive to the client via Common Gateway Interface (CGI) frameworks, which are very important for cross-network exchanges, e.g., between Zigbee and Bluetooth networks. The WDP architecture can also readily take advantage of peer-to-peer features of the client and local hardware access features, e.g., via the emerging Web Real Time Communication (WebRTC) interface. WDP's networking flexibility, combined with WVSNP-DASH's independently playable video segments (i.e., no need for manifest file or initialization segment), enables simultaneous streaming and interweaving of video segments from different sensors and different networks, e.g., from Bluetooth, Zigbee, and WiFi networks.

WDP Evaluation

Evaluation Set-Up

A prototype of WDP was extensively compared with popular DASH players considering the following metrics:

CPU load: Especially for mobile consumer devices, the central processing unit (CPU) load during video playback, which directly influences power consumption and battery drainage, should be low.

Memory consumption: The consumption of working memory, which is limited in mobile devices, gives an indication of the efficiency of resource handling.

Power consumption: Low power consumption at the server side, i.e., the sensor node, which captures, stores, and serves the video files, is critical.

For the prototype evaluation, a typical surveillance video was captured at a university. The 10 minute video (without audio) contains time-lapse captures of everyday outdoor activity and scenery around the university campus. The video was used for both VOD and LIVE video scenarios. For the LIVE video scenario, a node camera was pointed at the full-screen display of the prerecorded video while measurements were captured in real time. Focusing and positioning the node camera to see only the full-screen video display made the LIVE video essentially identical to the pre-recoded video. The H.264 encoded .mp4 video was generated with 640×360 pixel resolution, 500 kb/s, and 25 frames/s. The video was segmented into MPEG2 Transport Stream (TS) segments for HLS playback, independent MP4 segments for WVSNP-DASH playback, and ISO Base Media File Format (BMFF) segments for MPEG-DASH. The segments were created for 2, 5, 10, and 15 second segment lengths.

The WDP prototype was compared with HLS using the JWPlayer 6 with the HLSProvider plug-in and with MPEG-DASH using the DASH-JS player. The presented evaluations were performed with Google Chrome (version 32) web browser running on a client operating on a Ubuntu 13.10 64 bit, Dell OptiPlex 360 with Intel Core2 Duo E7300 2.66 GHz processor and 2 GB RAM. The evaluations were also run with a client operating on MacBook Air Mid 2012 with i5-3427U 1.8 GHz processor and 4 GB RAM as well as a Windows 7 64 bit client booted on the same MacBook and gave similar results.

The server node power consumption was measured from an i.MX6 ARM Cortex-A9, 1.2 GHz Quad core, 2 GB node development board. The server node captured video with a USB webcam and generated and served video segments via WiFi and a streamlined low-footprint mongoose HTTP server. The performance metrics were sampled 14,000 times during the 10 minute video transmission, which was replicated five times.

Client Node CPU Load and Memory Consumption

It was observed as shown in Table I below that for the 5 s LIVE scenario, WDP has a similar CPU load as HLS (JWPlayer 6) while the WDP memory consumption is somewhat lower than for HLS. On the other hand, for the 5 s VOD scenario, WDP has higher CPU load and memory consumption than HLS and MPEG-DASH (DASH-JS). The higher CPU load and memory consumption of WDP for the VOD scenario are mainly due to the WDP buffering algorithm for VOD, which fetches all segments as fast as the network bandwidth and the client FS space allocation allow. In contrast, HLS buffers only approximately three segments and discards them after playback. WDP stores all segments in the FS space leading to high memory usage. This WDP approach facilitates power savings on the server node by avoiding re-fetches during quality switches or rewind, or actions that reuse previously fetched VOD segments.

TABLE I

AVERAGE AND STANDARD DEVIATION (SD) OF CPU LOAD AND MEMORY CONSUMPTION (IN MEGA BYTE) ON WIFI CLIENT NODE AS WELL AS POWER CONSUMPTION (MEASURED THROUGH DRAWN CURRENT) ON SERVER NODE.

| | Live 5 s segments | | | | | |
|---|---|---|---|---|---|---|
| | CPU Load (%) | | Memory (MB) | | Current (mA) | |
| Framework | AVG | SD | AVG | SD | AVG | SD |
| HLS | 69.5 | 8.8 | 136 | 9 | 95.8 | 29.6 |
| WVSNP | 68.4 | 26.5 | 122 | 16 | 100 | 26.5 |
| WVSNP no-c | 31.2 | 12.1 | 126 | 15 | 100 | 26.5 |
| | VOD 5 s segments | | | | | |
| | CPU Load (%) | | Memory (MB) | | Current (mA) | |
| Framework | Avg. | SD | Avg. | SD | Avg. | SD |
| HLS | 61.2 | 6.3 | 145 | 7 | 37.5 | 9.92 |
| WVSNP | 79.6 | 12.1 | 182 | 18 | 49.5 | 8.27 |
| WVSNP no-c | 36.9 | 13.4 | 189 | 21 | 49.5 | 8.27 |
| DASH | 30 | 7 | 143 | 18 | N/A | N/A |
| | VOD 2 s segments | | | | | |
| | CPU Load (%) | | Memory (MB) | | Current (mA) | |
| Framework | Avg. | SD | Avg. | SD | Avg | SD |
| HLS | 62.8 | 7.4 | 145 | 9 | 48.8 | 8.04 |
| WVSNP | 79.2 | 10.2 | 187 | 26 | 51.1 | 8.43 |
| WVSNP no-c | 39.7 | 9 | 180 | 22 | 51.1 | 8.43 |
| | VOD 10 s segments | | | | | |
| | CPU Load (%) | | Memory (MB) | | Current (mA) | |
| Framework | Avg. | SD | Avg. | SD | Avg. | SD |
| HLS | 61.1 | 6.7 | 146 | 7 | 36.7 | 8.57 |
| WVSNP | 79.3 | 16 | 180 | 29 | 48.0 | 8.25 |
| WVSNP no-c | 37.3 | 14.4 | 200 | 25 | 48.0 | 8.25 |
| DASH | 29.5 | 6.5 | 168 | 21 | 39.1 | 9.13 |
| | Progressive Download of Full Video, No Segmentation | | | | | |
| | CPU Load (%) | | Memory (MB) | | Current (mA) | |
| Framework | Avg. | SD | Avg. | SD | Avg. | SD |
| Full Video | 28.7 | 4.5 | 91 | 2 | 43.1 | 9.57 |

The WDP LIVE buffering algorithm behaves similar to HLS. As Table I indicates, WDP LIVE playback has lower CPU load and memory consumption than HLS. This is remarkable in that the WDP prototype uses a resource-heavy canvas element as well as two video elements concurrently to render the video, while HLS uses a highly optimized HLSProvider Flash helper plug-in to the browser with only one video element. MPEG-DASH (DASH-JS) playback, included for the 5 and 10 s VOD scenarios in Table I, has the lowest CPU load and memory consumption. This MPEG-DASH result indicates that using pure JavaScript and MSE with one video element can be more efficient than using a plug-in.

In order to further examine the high CPU load and memory consumption of WDP for VOD, the WDP prototype was slightly modified to play segments directly in the video elements without multiplexing two video elements nor rendering on the canvas. This modified WDP, which is denoted by "WVSNP-no-c" in Table I, has significantly lower CPU load and memory consumption than HLS as well as similar CPU load and memory consumption as MPEG-DASH. This result for WVSNP-no-c, i.e., WDP without using the canvas element, indicates that the high WDP CPU load and memory consumption for VOD are mainly due to the canvas element. This validates that the use of full (independently playable) video segments does not increase client resource usage compared to the manifest/initialization segment file approach.

Server Node Power Consumption

Since the voltage readings were generally consistent at 5 V, only the current drawn by the server node during each scenario is reported as a relative measure of power consumption in Table I. The results for current in Table I indicate that the LIVE scenarios have significantly higher currents and thus higher power consumption than the VOD scenarios. This is because the server node captures, transcodes, stores, and serves the video segments at the same time. Importantly, for the LIVE scenario, the WDP prototype has only slightly higher power consumption than HLS. In interpreting these power results, it is important to note the differences in using ffmpeg for segment capture in the compared frameworks. HLS captured and transcoded LIVE video in an optimized built-in (native) HLS function of ffmpeg, which achieves highly efficient software-based capture and transcoding. On the other hand, WVSNP-DASH framework 100 captures used a prototype-level bash script that newly invoked ffmpeg for each LIVE segment capture. This means that the WVSNP-DASH framework 100 incurred extra power, resources, and inefficiencies for each context switch of launching ffmpeg, transcoding, storing, and then shutting down the ffmpeg process for each video segment capture. Moreover, WVSNP-DASH framework 100 interpreted a script at run time for every segment, adding to the resource usage. In contrast, HLS capture invoked ffmpeg only once at the start of the video stream capture and captured the remaining segments with the same optimized ffmpeg (from the original invocation context). These conceptual differences imply that an optimized native WVSNP-DASH framework 100 captures application has considerable power savings potential for LIVE video in the WVSNP-DASH framework 100 compared to the already optimized HLS framework.

A further potential for power savings arises from the WVSNP-DASH operation without a manifest file. HLS and MPEG-DASH require a manifest file that needs to be managed and re-read and updated during the capture and/or playback. For VOD, the manifest files and segments are typically static and the indices do not need to be continuously updated. However, for synchronization of LIVE video, the manifest files have to be typically re-fetched regularly for LIVE video synchronization. Additional processing to create special subsequent segments different from the initialization segment adds to the power consumption of HLS and MPEG-DASH for LIVE video.

For VOD, the results for current in Table I indicate that longer segments generally reduce the power consumption. Again, noting the inefficiencies in the prototype of the WVSNP-DASH framework 100 due to script interpretation and ffmpeg invocation for each video segment, there are the power saving potentials for WVSNP-DASH framework 100 compared to HLS and MPEG-DASH.

In order to further examine the impact of the segmented video streaming, the full university video was streamed via progressive download and the results are reported in the bottom line of Table I above. Table I indicates that 10 s segment HLS and MPEG-DASH streaming consumed less power compared to full-video streaming. These results indicate that segmented video streaming does not lead to higher server node power consumption than streaming a full (un-segmented) video to an HTML5 element. The 36.7 mA measured for HLS for 10 s VOD segments can be considered as the worst-case (maximum) current consumption expected of the WVSNP-DASH framework 100 using a specialized native capture. More generally, the comparison of currents for 10 s VOD segments and full video download indicates that segmented streaming can result in about 15% power savings compared to streaming progressively downloaded full videos. From further test evaluations, that are not included due to space constraints, it was noted that there is no benefit of using 15 s segments compared to 10 s segments.

In WVSNP-DASH framework 100, each video segment file may have its own file header. The file header contains all the video file properties and internal video container metadata, such as duration, compression type, size, and bit rate that are needed for decoding by any player. In HLS and MPEG-DASH, most of this file header metadata is moved to the first segment and the remaining segments are merely fixed data elements (blocks) that cannot be decoded independently. Thus, it might appear that WVSNP-DASH framework 100 introduces some overhead by including the file header in each video segment file, whereas HLS and MPEG-DASH are continuous streams with random access points due to preset intra-coded (I) frames. However, due to the self-contained file headers in each WVSNP-DASH segment, there is no lookup data that needs to be maintained and referenced at the server node every time from the initial segment when there are quality switches for dynamic adaptation. This reduction of server node processing for managing the video segments has the potential to reduce power in video sensor nodes. WVSNP-DASH segments can still be captured with specific I-frame positioning to match efficient transcoding practices.

Figure 4:
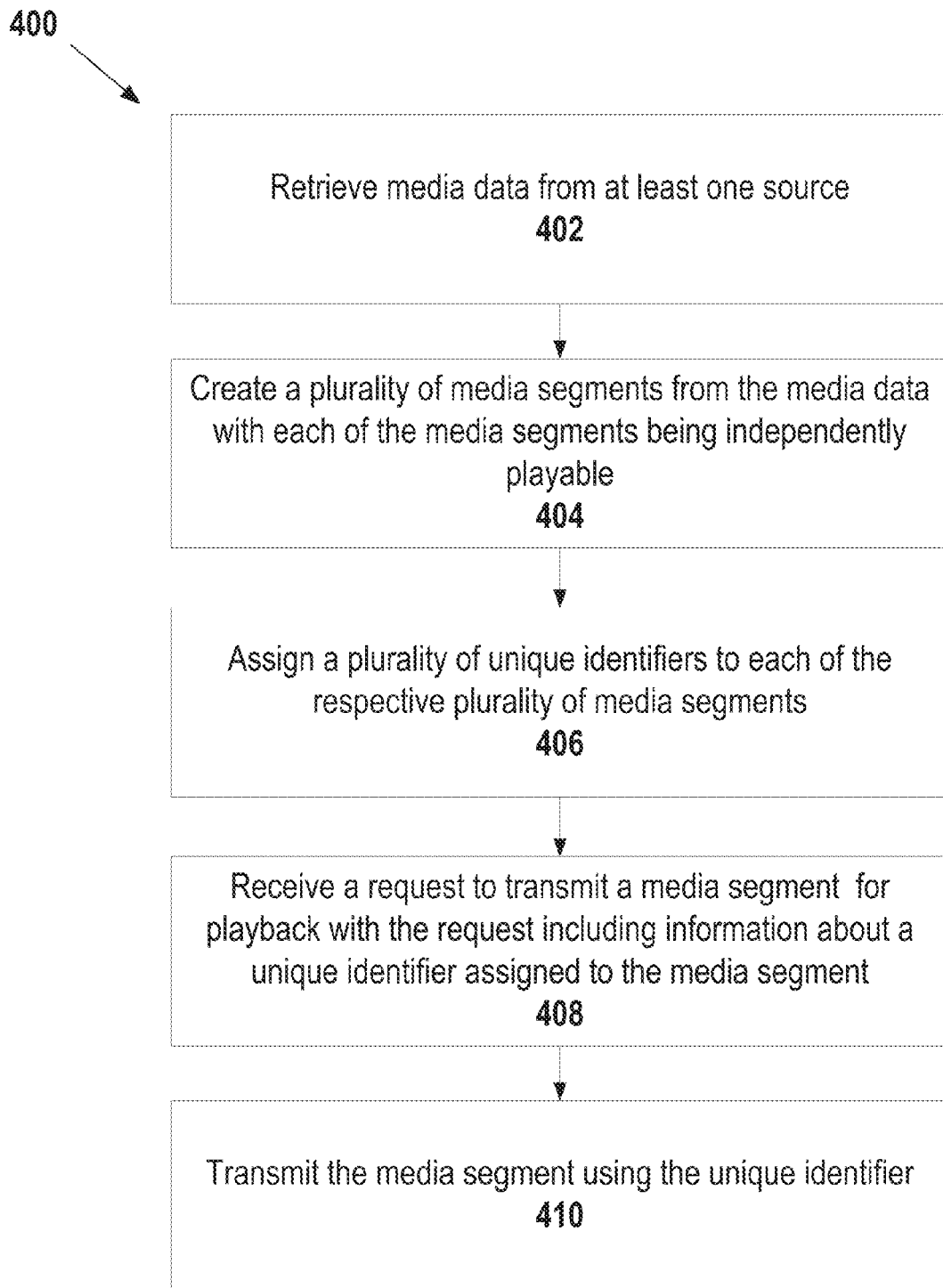
FIG. 4 is an exemplary process flow for media acquisition and distribution, according to aspects of the present disclosure.

FIG. 4 illustrates an exemplary process flow 400 for acquiring and distributing media data in accordance with the framework 100. In block 402, media data is retrieved from at least one data source. As discussed above, the media data may comprise audio, video, or multimedia data. More specifically, the media data may comprise, e.g., a video. The at least one source may comprise one or more sensors of a wireless sensor network configured to capture data in various formats. The at least one source may further comprise a data file containing media data. The at least one source may further comprise an information centric network such as a CDN. The media data may be stored locally on a data source or may be transferred to a remote storage node such as storage device 120.

In block 404, a plurality of media segments are created from the media data. Each of the media segments is independently playable. In one embodiment, the data sources capture and store media data as complete, individually playable media files. The media segments are preferably no longer than ten seconds. The media segments do not require special segment generation tools, manifest files, or initialization segments. Because each of the media segments are independently playable, the segments can be stored and distributed across multiple different locations.

In block 406, a plurality of unique identifiers is assigned to each of the respective plurality of media segments. A specific naming syntax is used to create and assign the unique identifiers to convey essential meta-information about the media segment thereby reducing dependencies to manifest and initialization files. In other words, using the naming syntax, each of the media segments can be independently retrieved and played and random playback of any segment can be executed by a player. Further, the unique identifier allows for a crawler-type network search such that individual media segments can be efficiently located and played. The naming syntax enables cloud repositories to offer media segments as part of data sets and services.

In block 408, a request is received to transmit a media segment for playback with the request including information about a unique identifier assigned to the media segment and the media segment is transmitted using the unique identifier in block 410. The request may be submitted by a media player such as media player 150. According to aspects of the present disclosure, no additional or extra information is requested or needed beyond information required to fetch or retrieve the individual media segment itself because the unique identifier embeds uniqueness, network, and playability options of the entire stream associated with the individual media segment. In other words, each media segment in the proposed framework is an independently playable file carrying its own essential metadata in the unique identifier.

Continuing with the example of FIG. 4, in one specific embodiment, a user, operating a consumer device 124 which is executing the media player 150, may request via the media player to view the end portion of a video captured by a sensor 110a. Consistent with the framework 100 of the above disclosure, the end portion of the video may have been captured as one or more end portion video segments which are associated with a specific time interval (end portion) of the video captured by the sensor 110a. In addition, the one or more end portion video segments may have been assigned one or more unique identifiers using the above described naming syntax. Because the one or more end portion video segments are independently playable, and because the framework 100 deploys the naming syntax, the user, using the media player 150, can request the media player 150 to retrieve the end portion of the video by calling the one or more end portion video segments (via the media player) by referencing the one or more unique identifiers assigned to the one or more end portion video segments for playback (without having to retrieve the entire video). As such, the media player 150 can quickly retrieve the end portion of the video for playback because the media player 150 does not have to loop through an entire file associated with the video, manifest file, or initialization segment but can instead quickly retrieve the end portion of the video for playback.

Figure 5:
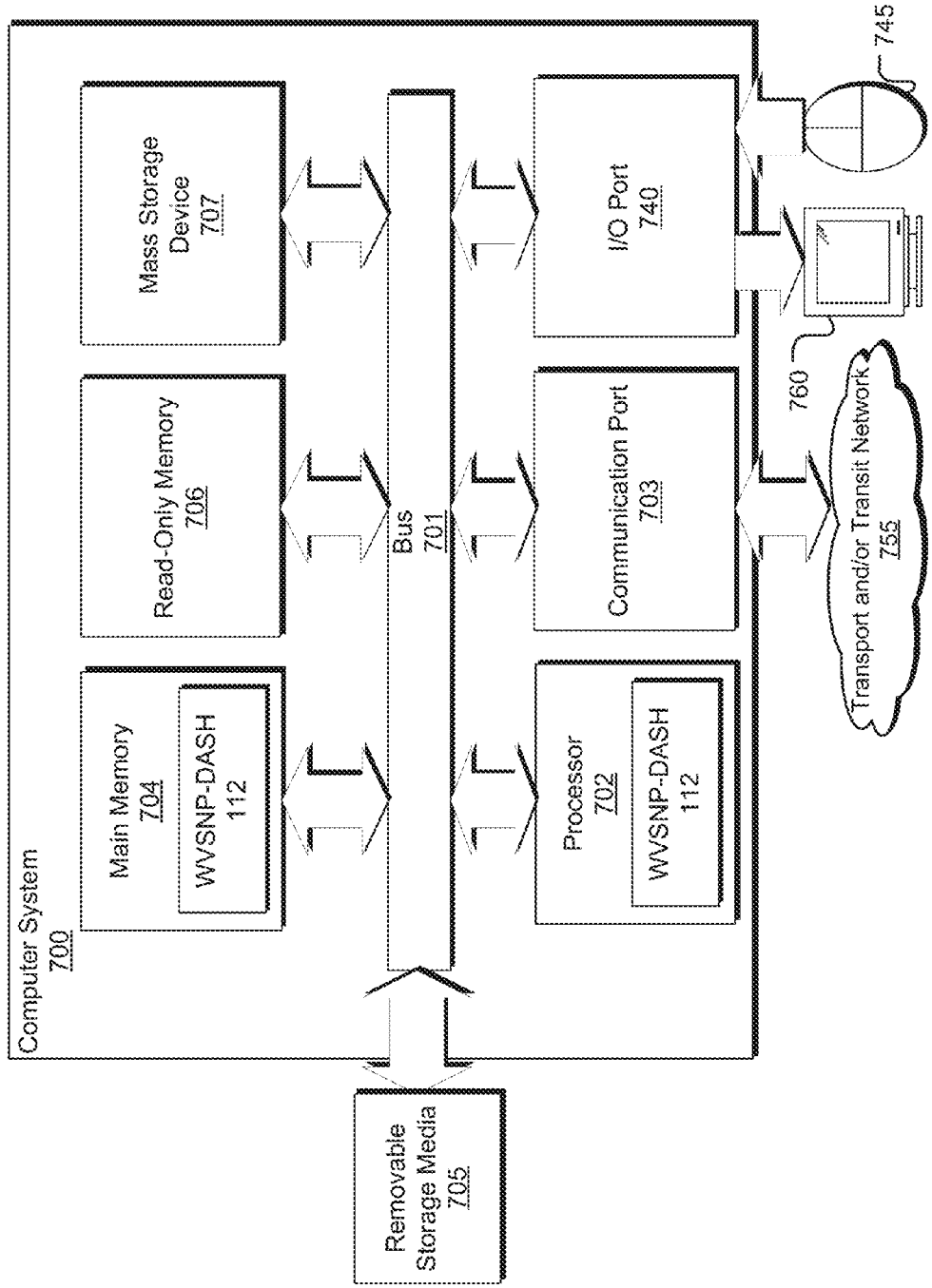
FIG. 5 illustrates an example of a computing system that may implement various services, systems, and methods discussed herein.

FIG. 5 is an example schematic diagram of a computing system 700 that may implement various methodologies discussed herein. For example, the computing system 700 may comprise a server node, a device 124, or the application server 140 used to execute one or more aspects of a WVSNP-DASH application 112 which assists with, e.g., the management of the framework 100, the media data segmentation, or execution of the media player 150. The computing system 700 includes a bus 701 (i.e., interconnect), at least one processor 702 or other computing element, at least one communication port 703, a main memory 704, a removable storage media 705, a read-only memory 706, and a mass storage device 707. Processor(s) 702 can be any known processor, such as, but not limited to, an Intel® Itanium® or Itanium 2® processor(s), AMD® Opteron® or Athlon MP® processor(s), or Motorola® lines of processors. Communication port 703 can be any of an RS-232 port for use with a modem based dial-up connection, a 10/100 Ethernet port, a Gigabit port using copper or fiber, or a USB port. Communication port(s) 703 may be chosen depending on a network such as a Local Area Network (LAN), a Wide Area Network (WAN), or any network to which the computer system 200 connects. Computing system may further include a transport and/or transit network 755, a display screen 760, an I/O port 740, and an input device 745 such as a mouse or keyboard.

Main memory 704 can be Random Access Memory (RAM) or any other dynamic storage device(s) commonly known in the art. Read-only memory 706 can be any static storage device(s) such as Programmable Read-Only Memory (PROM) chips for storing static information such as instructions for processor 702. Mass storage device 707 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 701 communicatively couples processor(s) 702 with the other memory, storage, and communications blocks. Bus 701 can be a PCI/PCI-X, SCSI, or Universal Serial Bus (USB) based system bus (or other) depending on the storage devices used. Removable storage media 705 can be any kind of external hard drives, thumb drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 704 is encoded with a WVSNP-DASH application 112 that supports functionality as discussed above. The WVSNP-DASH application 112 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 702 accesses main memory 704 via the use of bus 701 in order to launch, run, execute, interpret, or otherwise perform processes, such as through logic instructions, executing on the processor 702 and based on the WVSNP-DASH application 112 stored in main memory or otherwise tangibly stored.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages should be understood by the foregoing description, and it should be apparent that various changes may be made in the form, construction, and arrangement of the components without departing from the disclosed subject matter or without sacrificing all of its material advantages. The form described is merely explanatory, and it is the intention of the following claims to encompass and include such changes.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method of acquiring and distributing media data, comprising:
utilizing a computing device comprising at least one memory for storing instructions that are executed by at least one processor to perform operations including:
accessing media data from at least one data source;
creating a plurality of media segments from the media data with each of the plurality of media segments being independently playable, comprising:
utilizing a name syntax for each of the plurality of media segments, comprising:
syntactically naming a media segment of the plurality of media segments with a media segment name, the media segment name being unique to the media segment, the media segment name comprising metadata to encapsulate adaptive behavior of streaming and playback for the media segment,
wherein the media segment name defines information about the media segment's relationship with respect to other media segments of the plurality of media segments;
receiving a request to transmit the media segment of the plurality of media segments for playback with the request including information about the media segment name assigned to the media segment;
transmitting the media segment by referencing the media segment name; and
parsing the metadata of the media segment name to playback the media segment,
wherein the media segment name defines a quality and a size associated with the media segment of the plurality of media segments.

2. The method of claim 1, further comprising:
wherein the media data comprises video, audio, or multimedia data; and
wherein the data source comprises at least one of a sensor or data file.

3. The method of claim 1, wherein each of the plurality of media segments comprises a duration in a range of 0-10seconds.

4. The method of claim 2, wherein the media segment comprises a portion of an audio recording or a video and is associated with a specific time interval.

5. The method of claim 1, further comprising:
providing a media player;
transmitting the plurality of media segments to the media player; and
initiating playback of any of the plurality of media segments by the media player using a unique media segment name associated with the any of the plurality of media segments and without an initialization segment nor manifest file.

6. The method of claim 5, wherein the media player retrieves, buffers, selects, and schedules media transmission.

7. The method of claim 5, further comprising:
capturing the media data as the plurality of media segments for storage in a storage device in communication with the computing device, the computing device being remote from the media player; and
wherein the media player solely utilizes a plurality of unique media segment names associated with respective ones of the plurality of media segments to parse each of the plurality of media segments and to playback individual media segments of the plurality of media segments.

8. The method of claim 1, further comprising utilizing the name syntax and the plurality of media segments being independently playable to enable media object distribution across networks including cross-network data transfers between traditional Internet Protocol based networks and non-Internet Protocol networks.

9. The method of claim 1, wherein the plurality of media segments is created without having to specially format the media data to reduce server node power consumption.

10. The method of claim 1, wherein the media segment is decodable using a decoder engine native to a browser or any multimedia rendering canvas requesting the media segment.

11. A method of acquiring and distributing media data, comprising:
accessing digital media associated with a plurality of media segments, wherein each of the plurality of media segments covers a specified time interval and comprises an independently playable media object; and
applying a media segment naming syntax to the plurality of media segments, comprising:
syntactically naming a media segment of the plurality of media segments with a segment name, the segment name being unique to the media segment and defining metadata sufficient to enable playback of the media segment utilizing the segment name,
wherein the segment name defines a quality and a size of the media segment, and
wherein the media segment of the plurality of media segments is accessible for playback by parsing the metadata of the segment name.

12. The method of claim 11, wherein the segment name defines an index of the media segment with respect to the plurality of media segments.

13. The method of claim 11, wherein the media segment naming syntax is used to assign a unique file name to each of the plurality of media segments.

14. The method of claim 11, wherein each of the plurality of media segments is assigned a time-stamp.

15. The method of claim 11, wherein each of the plurality of media segments is uniquely monotonically indexed.

16. The method of claim 11, further comprising initiating playback of the plurality of media segments without a manifest file or initialization segment by virtue of the media segment naming syntax.

17. A system for acquiring and distributing media data comprising:
a data source, the data source associated with a media segment, the media segment comprising a segment name defined by a media segment naming syntax; and a media player configured for accessing the media segment from the data source by referencing the segment name associated with the media segment,
wherein the segment name is unique to the media segment and includes metadata defining a quality and size of the media segment, and
wherein the metadata of the segment name associated with the media segment includes sufficient information for access and playback of the media segment by the media player.

18. The system of claim 17, further comprising:
wherein the data source comprises a sensor for capturing one or more media segments; and
wherein the sensor communicates with the media player remotely via a network.

19. The system of claim 18, further comprising:
a mobile device configured to execute the media player; and
a cloud repository, wherein the one or more media segments comprise data sets and services of the cloud repository and accessible by the mobile device.

20. The system of claim 18, wherein each of the one or more media segments is immediately playable as independent multimedia objects upon retrieval by the media player.

21. The system of claim 17, wherein the media player is configured to select a different next media segment depending on a network environment associated with the media player and prior experience with previous fetches of media segments.

22. The system of claim 21, wherein the media player is further configured to:
select the different next media segment as a lower quality media segment based upon deteriorating bandwidth;
select the different next media segment from a different source based on location of a new source and latency of previous fetches; and
select the different next media segment from local storage or a completely different network type depending on dynamically changing security or accessibility issues with previous media segment selections or a next selection.

* * * * *